United States Patent

Takanashi

(10) Patent No.: US 9,549,160 B2
(45) Date of Patent: Jan. 17, 2017

(54) PORTABLE TERMINAL DEVICE AND IMAGE CORRECTION METHOD

(71) Applicant: FUJITSU LIMITED, Kawasaki-shi, Kanagawa (JP)

(72) Inventor: Takako Takanashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/592,795

(22) Filed: Jan. 8, 2015

(65) Prior Publication Data

US 2015/0264329 A1 Sep. 17, 2015

(30) Foreign Application Priority Data

Mar. 14, 2014 (JP) .................................. 2014-051726

(51) Int. Cl.
*H04N 9/73* (2006.01)
*G03B 7/00* (2014.01)
*H04N 5/235* (2006.01)
*H04N 1/60* (2006.01)

(52) U.S. Cl.
CPC ............ *H04N 9/735* (2013.01); *H04N 1/6077* (2013.01); *H04N 1/6086* (2013.01); *H04N 5/2351* (2013.01)

(58) Field of Classification Search
USPC .................. 396/225; 348/223.1–228.1, 655
See application file for complete search history.

(56) References Cited

U.S. PATENT DOCUMENTS

| 5,583,397 | A | * | 12/1996 | Ogawa | ................... | H05B 41/36 |
|---|---|---|---|---|---|---|
| | | | | | | 315/151 |
| 2003/0169348 | A1 | * | 9/2003 | Ikeda | .................... | H04N 9/735 |
| | | | | | | 348/223.1 |
| 2005/0264701 | A1 | * | 12/2005 | Huh | ........................ | H04N 9/73 |
| | | | | | | 348/655 |
| 2011/0150451 | A1 | * | 6/2011 | Kubota | .................. | G03B 15/03 |
| | | | | | | 396/159 |

FOREIGN PATENT DOCUMENTS

| JP | 2003-102018 | | 4/2003 |
|---|---|---|---|
| JP | 2008-219128 | * | 2/2007 |
| JP | 2008-219128 | | 9/2008 |
| JP | 2011-203437 | * | 10/2011 |

* cited by examiner

*Primary Examiner* — Aung S Moe
*Assistant Examiner* — Euel Cowan
(74) *Attorney, Agent, or Firm* — Maschoff Brennan (57) ABSTRACT

A portable terminal device having a first color temperature sensor that is provided on a first side of the portable terminal device, and having a second color temperature sensor that is provided on a second side of the portable terminal device, the portable terminal device includes, at least one camera module configured to capture an image; and an image processor configured to perform image correction to the image that is captured by the camera module based on at least one of first information from the first color temperature sensor and second information from the second color temperature sensor.

12 Claims, 10 Drawing Sheets

PORTABLE TERMINAL DEVICE AND IMAGE CORRECTION METHOD

CROSS-REFERENCE TO RELATED APPLICATION

This application is based upon and claims the benefit of priority of the prior Japanese Patent Application No. 2014-051726, filed on Mar. 14, 2014, the entire contents of which are incorporated herein by reference.

FIELD

The embodiments discussed herein are related to a portable terminal device, an image correction method, and an image correction program, for example.

BACKGROUND

Recently, portable terminal devices such as feature phones and smart phones have various functions in addition to a telephone function. One of such functions is a camera function. The portable terminal device may capture a high resolution image by a sophisticated camera function.

For example, the portable terminal device includes a camera lens, image capturing element, a red green blue (RGB) sensor, and so forth and may perform image correction such as white balance adjustment to an image captured by the camera lens and the image capturing element by using the RGB sensor. This allows the portable terminal device to capture a natural image regardless of an outdoor or indoor image capturing position. The RGB sensor that is used for such image correction is provided on a side on which the camera lens is installed, for example.

Differently, there is a case where the portable terminal device includes a display screen such as an LCD and the RGB sensor is installed on a side on which the display screen is provided. The RGB sensor provided on the display screen side is used for adjustment of colors on an image displayed on the display screen and as a proximity sensor, for example. In a case where the RGB sensor is used as the proximity sensor, when a face approaches a microphone or a speaker provided in the portable terminal device on a call, the RGB sensor provided on the display screen side detects the face, and a power supply to the display screen is temporarily turned off. Reduction in power consumption of the portable terminal device may thereby be expected, for example.

As for such image correction, the following technologies are disclosed, for example. For example, Japanese Laid-open Patent Publication No. 2011-203437 discloses a technology in which a first photometric sensor is provided on a display side of a display section in an electronic camera, a second photometric sensor is provided on a back side of the display side of the display section, and the display section thereby displays a corrected image to which adjustment is applied in accordance with a lighting environment by using a first lighting condition from the first photometric sensor and a second lighting condition from the second photometric sensor.

It is considered that this technology may provide a unit that properly adjusts appearances of colors of the image displayed on the display section in accordance with brightness of an environment.

Further, Japanese Laid-open Patent Publication No. 2003-102018 discloses a technology in which in an electronic still camera that includes a white balance adjustment unit that performs white balance adjustment based on a captured image, reliability of a stored white control signal is assessed based on the number of image capturing frames and an elapsed time from a prescribed time point, and a user is notified of low reliability in a case where the reliability is low.

It is considered that this technology may minimize incorrect white balance adjustment that occurs at an actual image capturing time point in a case the light source conditions of the lighting are different.

Further, Japanese Laid-open Patent Publication No. 2008-219128 discloses an image capturing device that changes image capturing modes by controlling the white balance of an image signal obtained by a charge coupled device (CCD) in accordance with the difference between an average first color of an atmosphere that is measured by a color sensor and an average second color of an object that is measured with the image signal.

It is considered that this technology may provide an image capturing device that may perform adjustment to an appropriate white balance in a short time.

SUMMARY

In accordance with an aspect of the embodiments, a portable terminal device having a first color temperature sensor that is provided on a first side of the portable terminal device, and having a second color temperature sensor that is provided on a second side of the portable terminal device, the portable terminal device includes, at least one camera module configured to capture an image; and an image processor configured to perform image correction to the image that is captured by the camera module based on at least one of first information from the first color temperature sensor and second information from the second color temperature sensor.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which.

DESCRIPTION OF EMBODIMENTS

Figure 10:
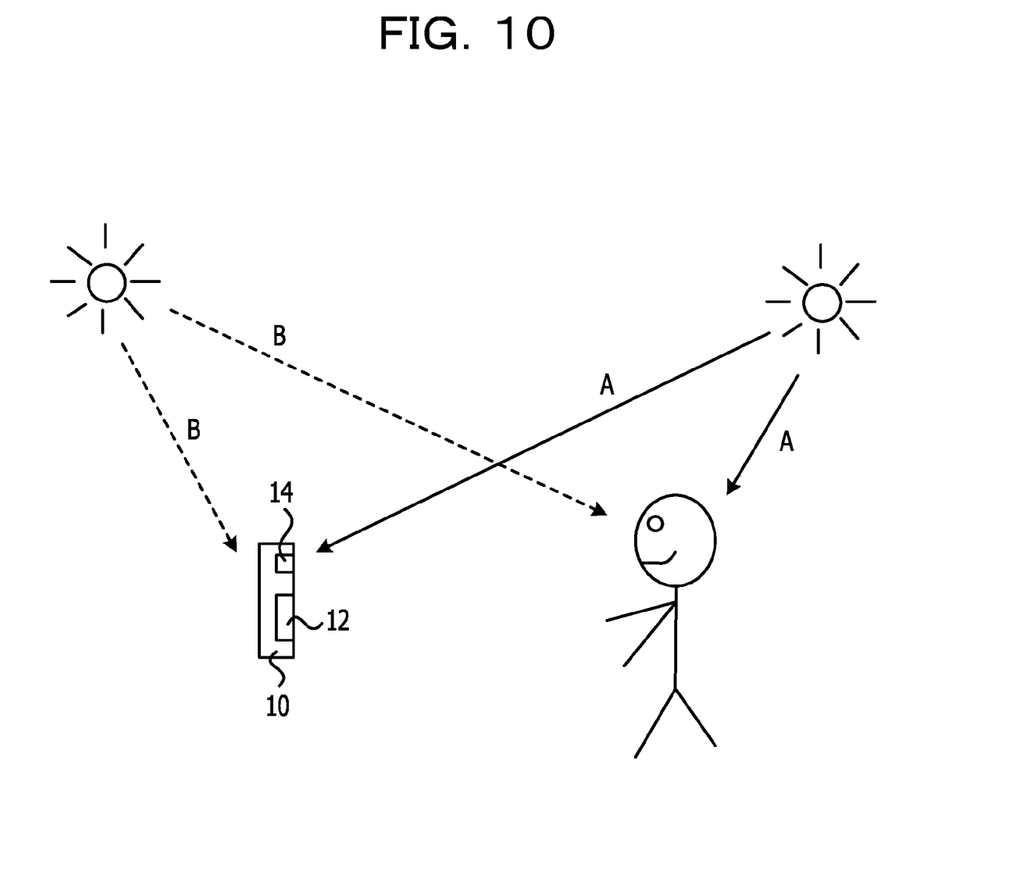
FIG. 10 illustrates an example of a case where the direction of light that is received by the object is different from the direction of light that is received by the RGB sensor.

In a portable terminal device, an RGB sensor that is used to perform image correction may be provided only on a side on which a camera lens is provided, for example. In such a case, a direction of light that is received by the RGB sensor is different from a direction of light that is received by an object, and thus the image correction may not appropriately be performed. FIG. 10 is a diagram for illustrating an example of such a case.

As illustrated in FIG. 10, a portable terminal device 10 includes a camera lens 12 and an RGB sensor (or color sensor) 14. The RGB sensor 14 is installed on a side on which the camera lens 12 is installed. In the example of FIG. 10, in a case where sunlight travels in A direction, the RGB sensor 14 directly receives the sunlight. On the one hand, an object 16 receives the sunlight from a back side, and the side of the object that is directed toward the portable terminal device 10 does not directly receive the sunlight. On the other hand, in a case where the sunlight travels in B direction, the RGB sensor 14 does not directly receive the sunlight, but the side of the object 16 that is directed toward the camera lens 12 directly receives the sunlight. In such a case, if the image correction is performed based on a signal detected by the RGB sensor 14, appropriate correction may not be performed even if an image of the object is corrected based on the signal detected by the RGB sensor 14 because light reception is different between the object and the RGB sensor 14. Such a phenomenon may occur in a case of a light source other than the sunlight, for example, a fluorescent light or the like.

The above-described technology in which the first and second photometric sensors are respectively provided on the display side and the back side of the display side of the display section is to adjust a display on the display section in accordance with the brightness of the environment by using the first and second photometric sensors but is not a technology to capture an image. Therefore, this technology may not perform appropriate image correction in a case where the direction of light that is received by the object is different from the direction of light that is received by the RGB sensor when an image is captured.

Further, the above-described technology in which the number of image capturing frames and the elapsed time from a prescribed time point are measured and the reliability of the stored white control signal is assessed is to assess the reliability of the white control signal. Thus, appropriate white balance may not be performed for an image captured with low reliability. Further, this technology makes no suggestion on how the image correction is performed in a case where the direction of light that is received by the object is different from the direction of light that is received by the RGB sensor when an image is captured.

In addition, the above-described technology that controls the white balance in accordance with the average first color or the like of the atmosphere that is measured by the color sensor makes no suggestion on how the image correction is performed in a case where the direction of light that is received by the object is different from the direction of light that is received by the RGB sensor when an image is captured.

In a case where appropriate image correction may not be performed in a case where the direction of light that is received by the object is different from the direction of light that is received by the color sensor when an image is captured, appropriate image correction in accordance with a surrounding environment may not be performed either.

Embodiments of this disclosure will hereinafter be described based on the above-described facts that are newly observed by the inventors.

First Embodiment

Figure 1:
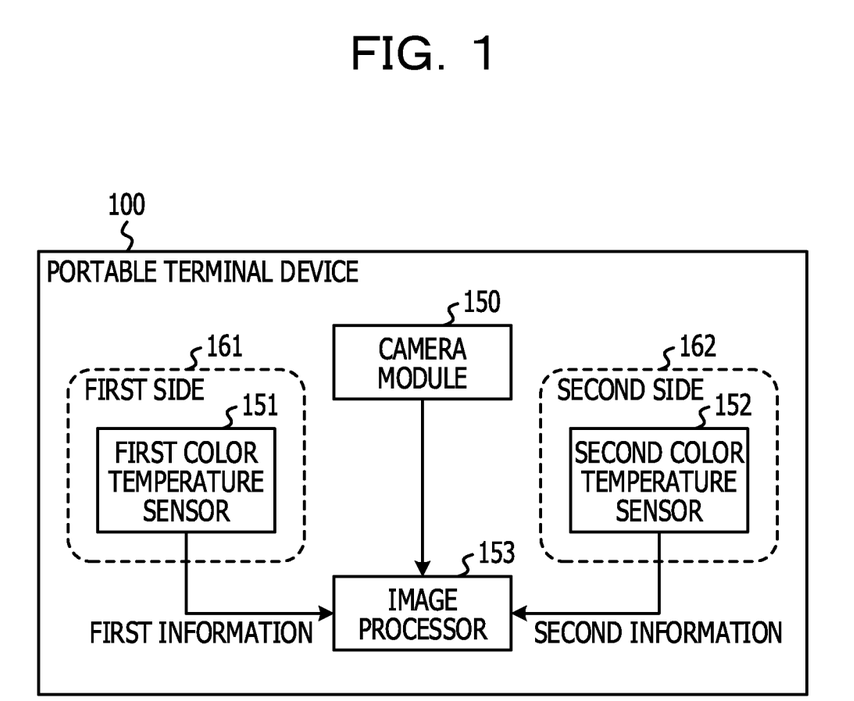
FIG. 1 illustrates a configuration example of a portable terminal device.

A first embodiment will be described. FIG. 1 illustrates a configuration example of a portable terminal device 100 in the first embodiment. The portable terminal device 100 may include information processing devices such as feature phones, smart phones, tablet terminals, personal digital assistants (PDA), and portable game consoles, for example.

The portable terminal device 100 includes a camera module 150, a first color temperature sensor 151, a second color temperature sensor 152, and an image processor 153.

The camera module 150 captures an image. The camera module 150 outputs image data of the captured image to the image processor 153.

The image processor 153 compares first information from the first color temperature sensor 151 that is provided on a first side 161 of the portable terminal device 100 with second information from the second color temperature sensor 152 that is provided on a second side 162 of the portable terminal device 100. The image processor 153 performs image correction to the image that is captured by the camera module 150 in accordance with a comparison result between the first information and the second information. In this case, the image processor 153 may not perform the image correction in accordance with the comparison result.

As described above, in the first embodiment, the first and second color temperature sensors 151 and 152 are provided on the first and second sides 161 and 162 of the portable terminal device 100. Accordingly, the portable terminal device 100 may obtain information that corresponds to a case where the direction of light that is received by the object is different from the direction of light that is received by the color sensor when an image is captured. Thus, the image processor 153 performs the image correction to the image that is captured by the camera module 150 based on each of the first information and the second information from the first and second color temperature sensors 151 and 152 and may thereby perform appropriate image correction in accordance with a surrounding environment.

In this case, the second side 162 is preferably provided on a back side with respect to the first side 161 of the portable terminal device 100. This is because such first and second color temperature sensors 151 and 152 that are respectively provided on the first and second sides 161 and 162 allow the image correction to correspond to the case where the direction of light that is received by the object is different from the direction of light that is received by the color sensor, compared to a case where the first and second color temperature sensors 151 and 152 are provided on other sides.

Second Embodiment

A second embodiment will next be described. An example of an external appearance of the portable terminal device and so forth will first be described, and a configuration example of the portable terminal device will next be described.

<Example of External Appearance of Portable Terminal Device>

Figure 2A:
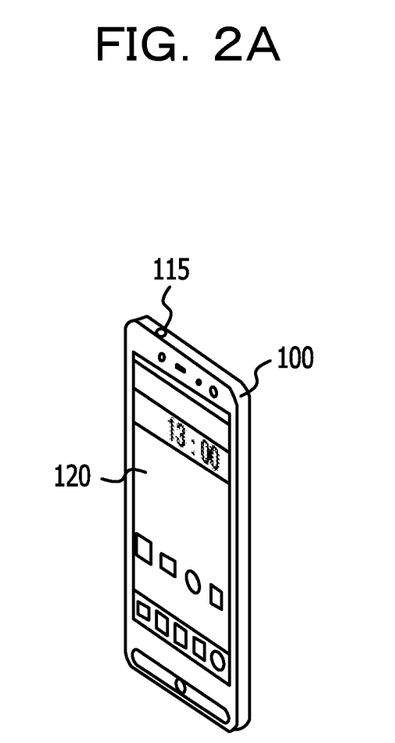
FIGS. 2A to 2C illustrate an example of an external appearance of the portable terminal device.
Figure 2B:
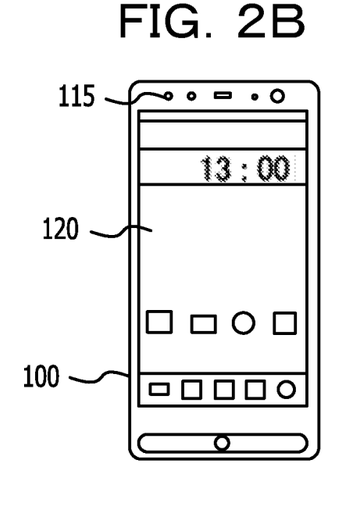
Figure 2C:
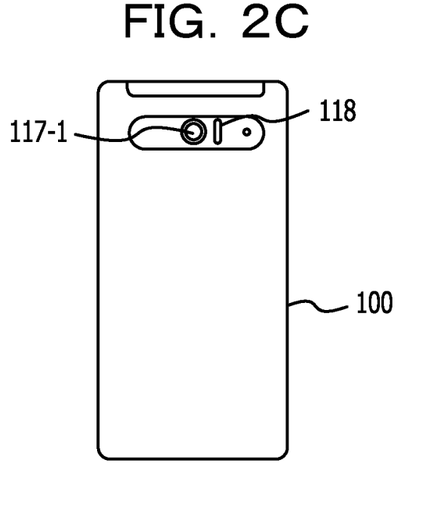

FIGS. 2A to 2C illustrate an example of an external appearance of the portable terminal device (which may hereinafter be referred to as terminal) 100 in the second embodiment. FIGS. 2A, 2B, and 2C illustrate the example of the external appearance in an oblique direction, from a front side, and from a back side, respectively.

The terminal 100 may be a feature phone, a smart phone, a tablet, a personal computer, or the like, for example. The example in FIGS. 2A to 2C illustrates an example of a smart phone. The terminal 100 performs radio communication with a radio base station device and is provided with various services such as call services and video streaming services via the radio base station device. The terminal 100 has a camera function of capturing an image in addition to a call function.

As illustrated in FIG. 2C, a camera lens 117-1 and an RGB sensor 118 are provided on the back side of the terminal 100. The RGB sensor 118 is provided on the same side as the side on which the camera lens 117-1 is installed, for example. The RGB sensor 118 is used to perform image correction to the image that is captured by the camera lens 117-1, for example. The RGB sensor 118 may hereinafter be referred to as camera module side RGB sensor 118, for example.

A camera module is provided in an internal portion of the terminal 100. The camera function in the terminal 100 may be realized by the camera module, and an image of the object or the like may be captured. The camera lens 117-1 and the camera module side RGB sensor 118 are portions of the camera module, for example. The camera module will be described later in detail.

Further, as illustrated in FIG. 2B and so forth, a liquid crystal display (LCD) 120 and an RGB sensor 115 are provided on a face side of the terminal 100. The RGB sensor 115 is provided on the same side as the side on which the LCD 120 is installed, for example. The RGB sensor 115 is used for adjustment of colors of a screen displayed on the LCD 120 and as a proximity sensor, for example.

In the first embodiment, the RGB sensor 115 is used as an RGB sensor for the image correction. Details will be described later. The RGB sensor 115 may hereinafter be referred to as LCD side RGB sensor 115.

<Configuration Example of Portable Terminal Device 100>

Figure 3:
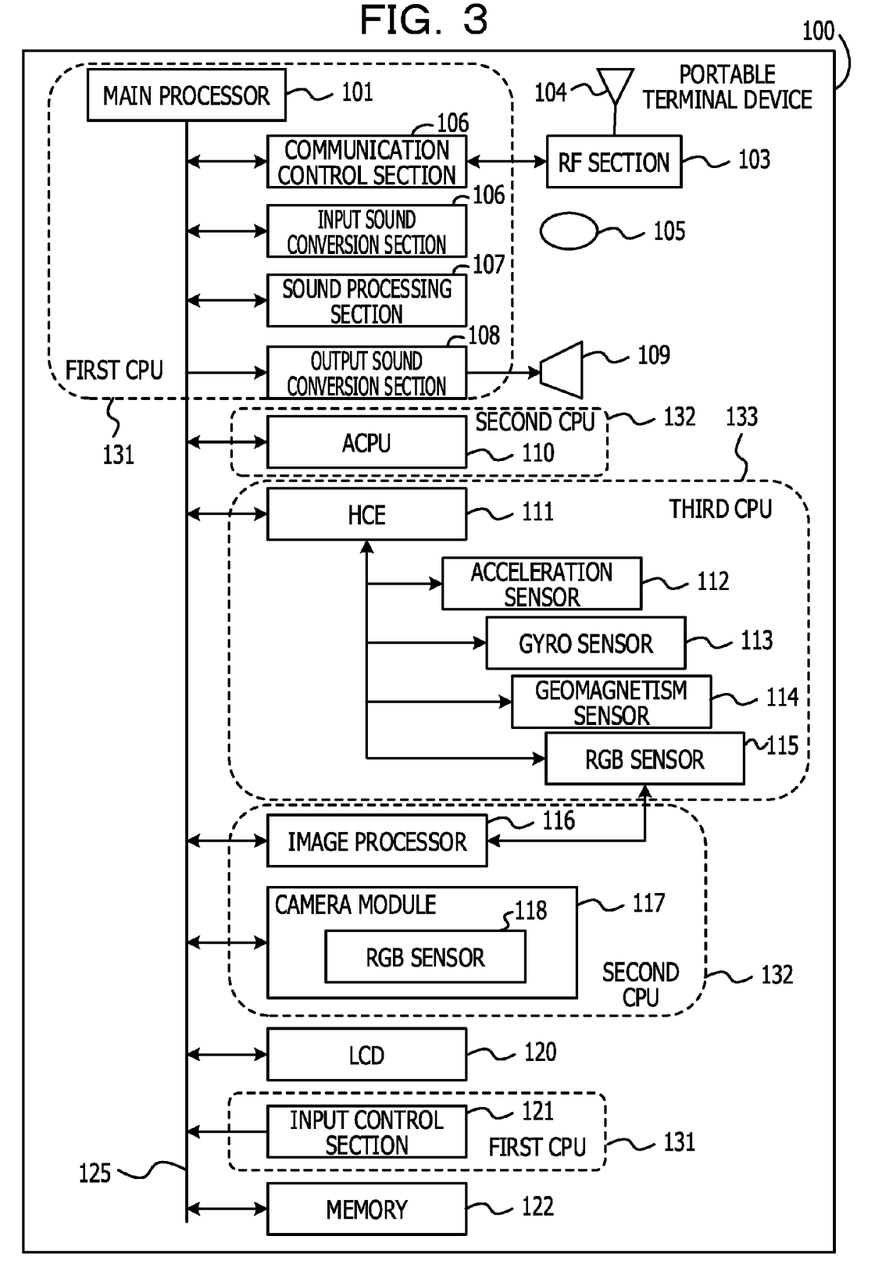
FIG. 3 illustrates a configuration example of the portable terminal device.

FIG. 3 illustrates a configuration example of the terminal 100. The terminal 100 includes a main processor 101, a communication control section 102, a radio frequency (RF) section 103, an antenna 104, a microphone 105, an input sound conversion section 106, a sound processing section 107, an output sound conversion section 108, and a speaker 109. Further, the terminal 100 includes an application control processing unit (ACPU) 110, a human centric engine (HCE) 111, an acceleration sensor 112, a gyro sensor 113, a geomagnetism sensor 114, and the LCD side RGB sensor 115. In addition, the terminal 100 includes an image processor 116, a camera module 117, the LCD 120, an input control section 121, and a memory 122. The camera module 117 includes the camera module side RGB sensor 118.

The main processor 101 is connected with the communication control section 102, the input sound conversion section 106, the sound processing section 107, the output sound conversion section 108, the ACPU 110, the HCE 111, the image processor 116, the camera module 117, the LCD 120, the input control section 121, and the memory 122 via a bus 125.

The main processor 101 controls each section of the terminal 100. For example, the main processor 101 performs control related to radio communication and control related to input and output of sounds.

The communication control section 102 performs various kinds of control related to radio communication. For example, the communication control section 102 applies a demodulation process or a decoding process to a baseband signal that is output from the RF section 103, thereby extracts user data (sound data, image data, and so forth) or the like, and outputs those to the sound processing section 107, the image processor 116, or the like. Further, the communication control section 102 receives the user data or the like from the sound processing section 107, the image processor 116, or the like, applies a coding process, a modulation process, or the like to the user data or the like, and outputs those to the RF section 103.

The RF section 103 performs frequency conversion of a radio signal in a radio band that is received by the antenna 104 into a baseband signal in the baseband (down-conversion) or performs frequency conversion of a signal output from the communication control section 102 into the radio signal in the radio band (up-conversion).

The antenna 104 transmits the radio signal output from the RF section 103 to the radio base station device or receives the radio signal transmitted from the radio base station device and outputs the signal to the RF 103.

The input sound conversion section 106 converts a sound input from the microphone 105 into digital sound data and outputs the converted sound data to the sound processing section 107, for example.

The sound processing section 107 performs a process of canceling noises of the sound data output from the input sound conversion section 106 or the like or performs a compression process of the sound data and outputs the sound data that result from the sound processing to the communication control section 102 or the like, for example. Further, the sound processing section 107 performs a process of expanding the compressed sound data or canceling noises for the sound data output from the communication control section 102 or the like and outputs the sound data that result from the sound processing to the output sound conversion section 108 or the like, for example.

The output sound conversion section 108 receives the sound data from the sound processing section 107, converts the digital sound data into analog sound data, and allows the sound to be output from the speaker 109, for example.

The ACPU 110 is a CPU for applications and controls the image processor 116, the camera module 117, and so forth, for example.

The HCE 111 functions as a sub-processor of the ACPU 110 and controls the acceleration sensor 112, the gyro sensor 113, the geomagnetism sensor 114, and the LCD side RGB sensor 115, for example.

The acceleration sensor 112 detects an acceleration of the terminal 100 by a capacitance detection method, a piezoresistance method, or the like, for example. The gyro sensor 113 detects an angular velocity of the terminal 100 by using a mechanical rotation method or the like to an internal object, for example. The geomagnetism sensor 114 detects a fluctuation of an external magnetic field and thereby detects the direction of the terminal 100, for example.

The image processor 116 performs the image correction to the image data output from the camera module 117 or performs image processing such as compression of the image data and outputs the image data that result from the image processing to the communication control section 102, the memory 122, or the like, for example. The image processor 116 performs image processing such as an expansion process or noise canceling to the compressed image data output from the communication control section 102 or the like and outputs the image data that result from the image processing to the LCD 120, the memory 122, or the like. The image processor 116 will be described later in detail.

The camera module 117 is a section that realizes the camera function in the terminal 100 and also includes the camera module side RGB sensor 118, the camera lens 117-1, an image capturing element, and so forth. The camera module 117 will be described later in detail.

The LCD 120 is a liquid crystal display screen in the terminal 100 and may display, in the screen, operation keys or the like that enable an operation. For example, the operation keys that are displayed on the LCD 120 are operated, thereby starting the camera module 117 (or a camera).

The input control section 121 is a button for turning on or off a power supply of the terminal 100, a button for turning on or off a power supply of the LCD 120, or the like, for example. The input control section 121 outputs a signal that corresponds to a button operation to the main processor 101 or the like and may thereby turn on the power supply of the LCD 120 or the power supply of the terminal 100 by control of the main processor 101 or the like.

The memory 122 stores the sound data, the image data, other data, and so forth.

As illustrated in FIG. 3, the terminal 100 may have a hardware configuration that includes a first CPU 131, a second CPU 132, and a third CPU 133. In this case, the terminal 100 includes the first to third CPUs 131 to 133, the RF section 103, the antenna 104, the microphone 105, the speaker 109, the LCD 120, and the memory 122.

The first CPU 131 corresponds to the main processor 101, the communication control section 102, the input sound conversion section 106, the sound processing section 107, the output sound conversion section 108, and the input control section 121, for example.

Further, the second CPU 132 corresponds to the ACPU 110, the image processor 116, and the camera module 117.

In addition, the third CPU 133 corresponds to the HCE 111, the acceleration sensor 112, the gyro sensor 113, the geomagnetism sensor 114, and the LCD side RGB sensor 115.

The first to third CPUs 131 to 133 may be processors, controllers, or the like such as micro processing units (MPU) and field-programmable gate arrays (FPGA), for example. The first to third CPUs 131 to 133 read out and execute programs stored in the memory 122 and may thereby realize the functions of the main processor 101, the communication control section 102, the RGB sensors 115 and 118, the image processor 116, and so forth.

<Configuration Example of RGB Sensors 115 and 118 and Image Processor 116>

A configuration example of the RGB sensors 115 and 118 and the image processor 116 will next be described.

Figure 4:
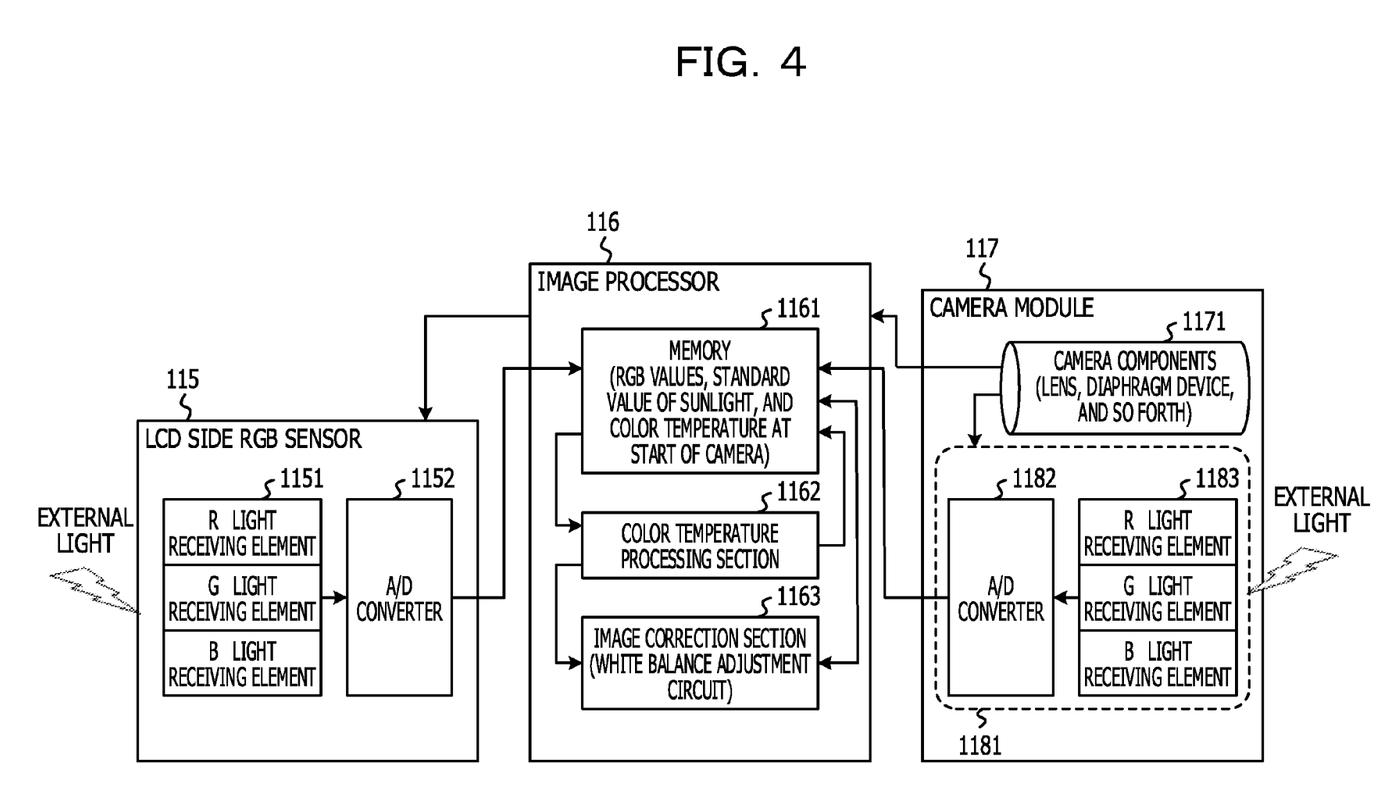
FIG. 4 illustrates a configuration example of RGB sensors and an image processor.

FIG. 4 illustrates a configuration example of the RGB sensors 115 and 118 and the image processor 116. The LCD side RGB sensor 115 includes an RGB light receiving element 1151 and an analog-to-digital (A/D) converter 1152.

The RGB light receiving element 1151 is a photodiode, for example, and converts received light into an electric signal by photoelectric conversion. In this case, the RGB light receiving element 1151 includes three light receiving elements of R, G, and B, thereby generates RGB signals (which may hereinafter be referred to as RGB data (or image data)) as electric signals, and outputs the RGB signals to the A/D converter 1152. The RGB light receiving element 1151 is formed as plural RGB light receiving elements 1151 in the LCD side RGB sensor 115, and the plural RGB light receiving elements 1151 configure the image capturing element.

The A/D converter 1152 converts analog RGB data output from the RGB light receiving elements 1151 into digital RGB data and outputs the converted RGB data to the image processor 116.

Meanwhile, the camera module 117 includes camera components 1171 and the camera module side RGB sensor 118. The camera components 1171 includes the camera lens 117-1 illustrated in FIG. 2C, a diaphragm device, and so forth.

The camera module side RGB sensor 118 includes an RGB light receiving element 1181 and an A/D converter 1182.

The RGB light receiving element 1181 is also a photodiode, for example, converts received light into an electric signal by photoelectric conversion, and generates RGB data as electric signals. The RGB light receiving element 1181 is also formed as plural RGB light receiving elements 1181 in the camera module 117.

The A/D converter 1182 converts analog RGB data output from the RGB light receiving elements 1181 into digital RGB data and outputs the converted RGB data to the image processor 116.

The image processor 116 includes a memory 1161, a color temperature processing section 1162, and an image correction section 1163.

The memory 1161 stores the RGB data output from the two RGB sensors 115 and 118 (or values of R, G, and B contained in the RGB data; the values of R, G, and B may hereinafter be referred to as RGB value). Further, the memory 1161 stores a standard value of the color temperature of the sunlight. The standard value will be described later in detail. In addition, the memory 1161 also stores color temperature data that correspond to the RGB data that are detected by the LCD side RGB sensor 115 when the camera is started. The color temperature data are data (or values) that result from conversion of the concerned RGB data stored in the memory 1161 by the color temperature processing section 1162.

The memory 1161 may be provided in the image processor 116 or may correspond to the memory 122 provided outside of the image processor 116.

The color temperature processing section 1162 converts the RGB data stored in the memory 1161 into the color temperature data (or color temperature values, which may hereinafter be referred to as color temperature data) and stores the converted color temperature data in the memory 1161. The color temperature data may be obtained by the following calculation, for example.

That is, the color temperature processing section 1162 converts the RGB values in an RGB color coordinate system into XY chromaticity values in an XYZ color coordinate system and converts the converted XY chromaticity values into uv chromaticity values in an Luv color coordinate system. In addition, the color temperature processing section 1162 calculates an absolute temperature that corresponds to the uv chromaticity values as the color temperature. Such conversion, calculation, and so forth of the color coordinate systems are performed by the basic arithmetic operations, obtainment of values by using a table that represents a correspondence relationship retained in the memory 1161 and so forth by the color temperature processing section 1162, for example.

The color temperature is a unit or a criterion that represents the color of light that is emitted by a certain light source by a quantitative value, and kelvin (K), lux (lx), or the like is used as a unit.

In the second embodiment, the color temperature processing section 1162 performs the following process, for example. That is, the color temperature processing section 1162 calculates the color temperature data that correspond to the RGB data generated by the LCD side RGB sensor 115. Further, the color temperature processing section 1162 reads out the standard value of a color temperature related to the sunlight that is stored in the memory 1161 from the memory 1161. The color temperature processing section 1162 then compares the color temperature that corresponds to the LCD side RGB sensor 115 with the standard value and outputs a comparison result to the image correction section 1163. Details will be described in an operation example.

The image correction section 1163 performs (or does not perform) the image correction to the image that is captured by the camera module 117 in accordance with the comparison result from the color temperature processing section 1162. In a case where the image correction is performed, the image correction section 1163 reads out the RGB data of the image captured by the camera module 117 from the memory 1161 and performs the image correction to the RGB data. As the image correction, automatic exposure (AE) correction or the like is performed by adjustment of the RGB values or the like, for example. Details of the image correction will also be described in the operation example. The image correction section 1163 outputs the image data to which the image correction is performed or the image data to which the image correction is not performed to the LCD 120 or the memory 122.

The first color temperature sensor 151 in the first embodiment corresponds to the LCD side RGB sensor 115, the memory 1161, and the color temperature processing section 1162 in the second embodiment, for example. Further, the second color temperature sensor 152 in the first embodiment corresponds to the camera module side RGB sensor 118, the memory 1161, and the color temperature processing section 1162 in the second embodiment, for example. In addition, the image processor 153 in the first embodiment corresponds to the image processor 116 in the second embodiment, for example.

Operation Example

Figure 5:
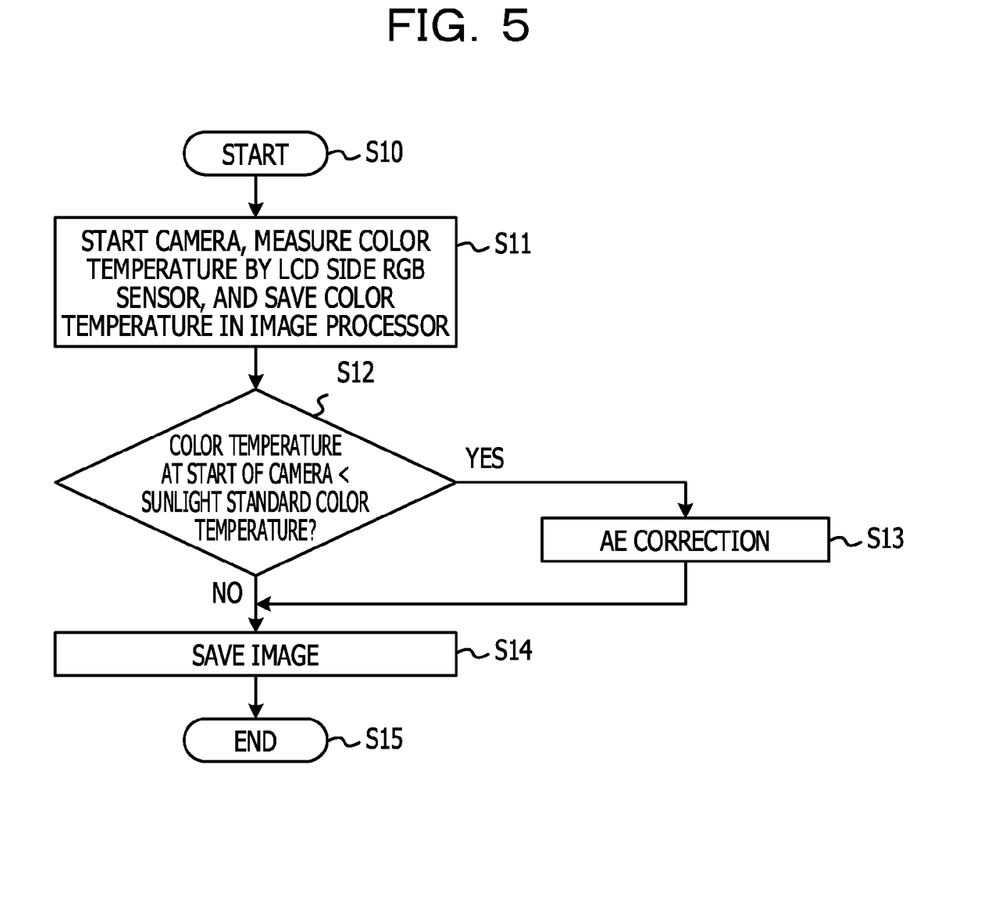
FIG. 5 is a flowchart that illustrates an operation example of the portable terminal device.

An operation example in the terminal 100 will next be described. FIG. 5 is a flowchart that illustrates an operation example in the second embodiment.

When the terminal 100 starts the process (S10), the terminal 100 starts the camera, measures the color temperature by the LCD side RGB sensor 115, and saves the color temperature in the image processor 116 (S11).

Figure 6:
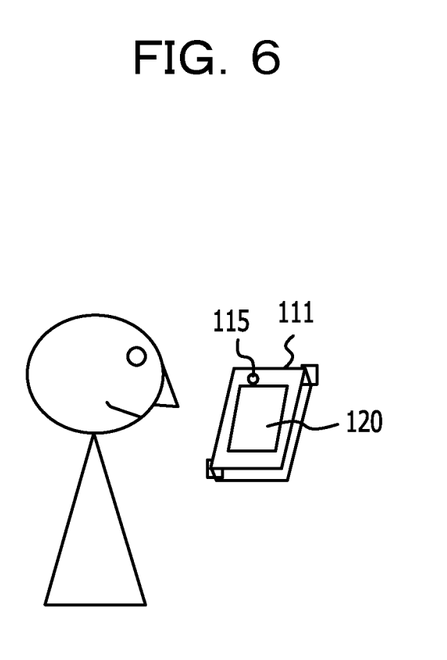
FIG. 6 illustrates a use example of the portable terminal device.

For example, the side of the LCD 120 of the terminal 100 may be directed toward the sky when the camera is started. FIG. 6 illustrates such a state. In a case where the camera is started by operating the operation keys or the like that are displayed on the LCD 120, the side of the LCD 120 is directed toward the sky.

The LCD side RGB sensor 115 measures the RGB values when the camera is started and then obtains the color temperature value that corresponds to the RGB values, and the brightness around the object of the image capturing may thereby be obtained. The image processor 116 calculates the color temperature in the color temperature processing section 1162 with respect to the RGB values that are obtained by the LCD side RGB sensor 115 when the camera is started and saves the color temperature value in the memory 1161.

Returning to FIG. 5, the terminal 100 next determines whether or not the color temperature at the time when the camera is started is lower than a standard color temperature of the sunlight (S12). For example, the color temperature processing section 1162 reads out the color temperature value at the time when the camera is started and the standard color temperature value of the sunlight from the memory 1161 and compares the two color temperature values, thereby making a determination.

The terminal 100 performs the AE correction (or white balance adjustment, which may hereinafter be referred to as "AE correction") (S13) in a case where the color temperature at the time when the camera is started is lower than the standard color temperature of the sunlight (YES in S12). The case where the color temperature at the time when the camera is started is lower than the standard color temperature of the sunlight is a case where the environment at the time when the camera is started is darker than a case where an image is captured in the sunlight, for example. In a case where the environment is dark, the captured image becomes dark as a whole. In such a case, the terminal 100 corrects the RGB data of the image captured by the camera module 117 and performs the AE correction such that the image becomes brighter as a whole.

It is assumed that an image of the object is captured at an arbitrary time point after the camera is started (S11) and before the AE correction is performed (S13), for example.

Specifically, the following process is performed, for example. That is, when the color temperature processing section 1162 of the image processor 116 detects that the color temperature value at the time when the camera is started is lower than the standard color temperature value of the sunlight, the color temperature processing section 1162 outputs the comparison result to the image correction section 1163. When the image correction section 1163 obtains the comparison result, the image correction section 1163 obtains the RGB data of the image captured by the camera module 117 from the memory 1161, multiplies all the RGB values by a prescribed ratio, and changes the RGB values at the obtainment to larger RGB values, thereby performing the AE correction. Alternatively, the image correction section 1163 may perform the image correction by correcting values that are offset by a certain value or larger among the RGB values obtained from the memory 1161 to a reference value or lower. Accordingly, the image correction section 1163 may correct a dark image to a bright image, for example.

The terminal 100 then saves the image data that result from the AE correction in the memory 1161 (S14) and finishes a series of processes (S15).

On the other hand, in a case where the color temperature at the time when the camera is started is equivalent to or higher than the color temperature of the sunlight (NO in S12), the terminal 100 saves the image data with no particular image correction (S14) and finishes a series of processes (S15).

In this case, the environment at the time when the camera is started is as bright as or brighter than an environment in the sunlight. In the second embodiment, in such a case, the process is finished without performing the AE correction.

As described above, in the second embodiment, the terminal 100 detects the color temperature by using a state where the side of the LCD 120 of the terminal 100 is directed toward the sky when the camera is started. Thus, the color temperature around the object may be detected with high accuracy. Further, the terminal 100 uses the color temperature for a determination of whether or not the image correction is performed and may thus perform appropriate image correction in accordance with the color temperature around the object, that is, in accordance with a surrounding environment.

Third Embodiment

A third embodiment will next be described. The third embodiment is an example where a determination is made whether or not the image correction is performed by using the two RGB sensors 115 and 118 that are the LCD side RGB sensor 115 and the camera module side RGB sensor 118. A configuration example of the terminal 100 in the third embodiment is similar to the second embodiment and is illustrated in FIGS. 2A to 4, for example.

Figure 7:
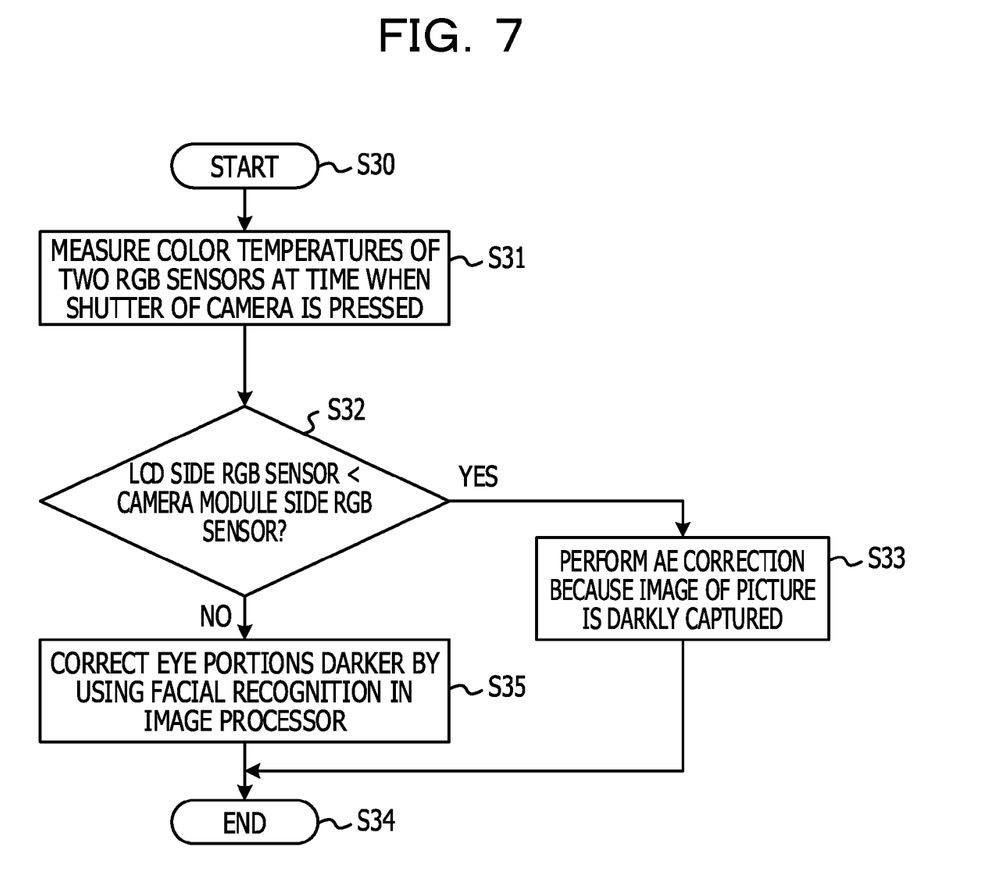
FIG. 7 is a flowchart that illustrates an operation example of the portable terminal device.

FIG. 7 is a flowchart that illustrates an operation example in the third embodiment. When the terminal 100 starts the process (S30), the terminal 100 measures the color temperatures in the two RGB sensors 115 and 118 when the shutter of the camera is pressed (S31).

For example, the measurement is performed as follows. That is, when the shutter in the camera components 1171 is pressed, a signal that indicates that the shutter is pressed is output to the camera module side RGB sensor 118. Further, the signal is also output to the image processor 116, and the image processor 116 outputs the signal to the LCD side RGB sensor 115. The two RGB sensors 115 and 118 obtain the RGB data on receiving the signal. In this case, the camera module side RGB sensor 118 obtains the RGB data of the object side (for example, the first side), and the LCD side RGB sensor 115 obtains the RGB data of the opposite side to the object side (for example, the second side provided on the back side of the first side). The RGB data obtained by the two RGB sensors 115 and 118 are sent to the memory 1161 of the image processor 116. The color temperature processing section 1162 obtains the RGB data obtained by the two RGB sensors 115 and 118 from the memory 1161 and calculates the color temperature data with respect to the two sets of RGB data. A calculation method of the color temperature data is similar to the second embodiment, for example.

The terminal 100 next determines whether or not the color temperature from the LCD side RGB sensor 115 is lower than the color temperature of the camera module side RGB sensor 118 (S32).

In a case where the color temperature from the LCD side RGB sensor 115 is lower than the color temperature of the camera module side RGB sensor 118 (YES in S32), the terminal 100 performs the image correction by the AE correction to make the captured image a brighter image (S33).

Figure 8A:
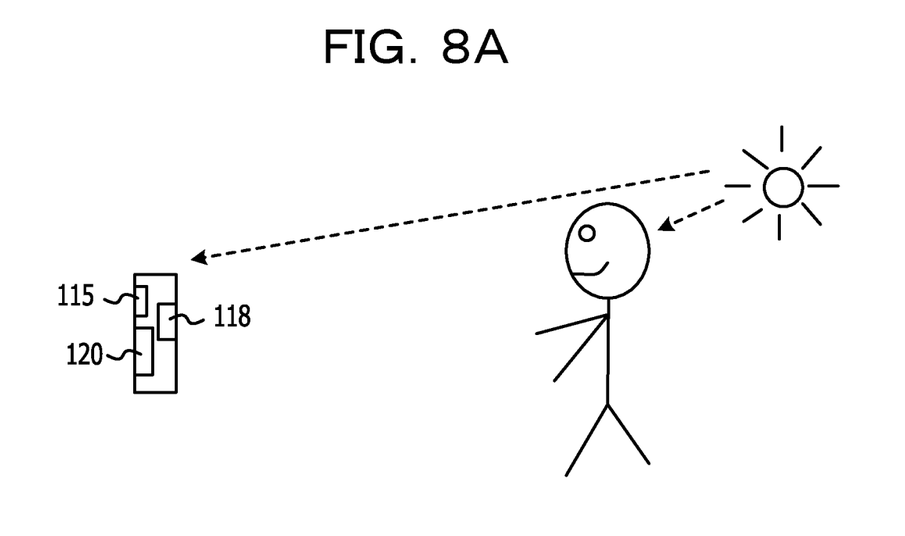
FIGS. 8A and 8B illustrate examples of cases where a direction of light that is received by an object is different from a direction of light that is received by the RGB sensors.

FIG. 8A illustrates an example of a case where the direction of light that is received by the object is different from the direction of light that is received by the RGB sensors. In a case illustrated in FIG. 8A, the camera module side RGB sensor 118 directly receives the sunlight, but the LCD side RGB sensor 115 does not directly receive the sunlight. Further, the object is directed toward the camera with the sunlight on the back. In such a case, the color temperature from the LCD side RGB sensor 115 becomes lower than the color temperature from the camera module side RGB sensor 118. In such a case, when the terminal 100 captures an image of the object, the image becomes dark compared to a case where the object directly receives the sunlight. In such a case, the terminal 100 performs the AE correction to correct the dark image to a bright image. Backlight correction or the like may be used as an image correction method of making an image that is darkly captured brighter.

Specifically, the following process is performed, for example. That is, the color temperature processing section 1162 compares the two color temperatures that are calculated in S31. In a case where the color temperature processing section 1162 detects that the color temperature from the LCD side RGB sensor 115 is lower than the color temperature of the camera module side RGB sensor 118, the color temperature processing section 1162 outputs the detection result (or the comparison result) to the image correction section 1163. When the image correction section 1163 obtains the comparison result, the image correction section 1163 reads out the RGB data of the image captured by the camera module 117 from the memory 1161 and applies the AE correction to the RGB data. A method of the AE correction is performed in a similar manner to the method described in the second embodiment, for example. The image correction section 1163 stores the RGB data that result from the image correction in the memory 1161.

Returning to FIG. 7, on the other hand, in a case where the color temperature from the LCD side RGB sensor 115 is equivalent to or higher than the color temperature from the camera module side RGB sensor 118 (NO in S32), the terminal 100 performs red-eye correction that corrects eye portions darker by using facial recognition in the image processor 116 (S35).

Figure 8B:
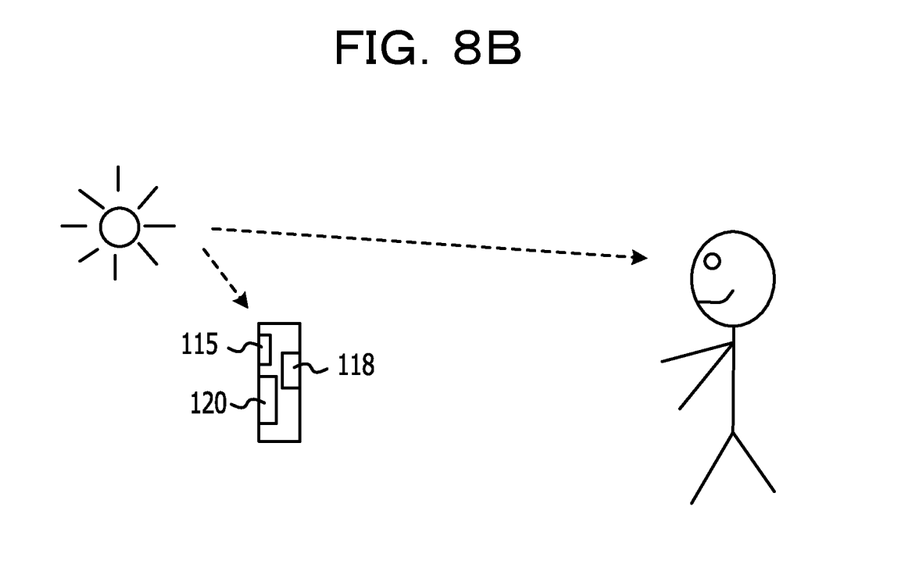

FIG. 8B illustrates an example of a case where the direction of light that is received by the object is different from the direction of light that is received by the RGB sensors. In a case illustrated in FIG. 8B, the LCD side RGB sensor 115 directly receives the sunlight, but the camera module side RGB sensor 118 does not directly receive the sunlight. The object directly receives the sunlight and is directed toward the camera. In such a case, the color temperature from the LCD side RGB sensor 115 becomes equivalent to or higher than the color temperature from the camera module side RGB sensor 118. Accordingly, when the terminal 100 captures an image of the object, a bright image is captured because the object directly receives the sunlight. In this case, in a case where the object is an animal such as a human, the eyes of the object in an image may be captured redder than normal. In such a case, the terminal 100 performs the red-eye correction.

Specifically, the following process is performed, for example. That is, the color temperature processing section 1162 compares the two color temperatures that are calculated in S31. In a case where the color temperature processing section 1162 detects that the color temperature from the LCD side RGB sensor 115 is equivalent to or higher than the color temperature from the camera module side RGB sensor 118, the color temperature processing section 1162 outputs the detection result (or the comparison result) to the image correction section 1163. When the image correction section 1163 obtains the comparison result, the image correction section 1163 reads out the RGB data of the image captured by the camera module 117 from the memory 1161 and obtains the RGB data of the eye portions of the object based on the RGB data, difference, and so forth of the image in a certain area. The image correction section 1163 then corrects data values that correspond to R among the RGB data related to the eye portions to lower values than the obtained values.

Alternatively, the image correction section 1163 corrects the data values that correspond to R among the obtained RGB data related to the eye portions (or pixel values related to red) to lower values than a reference value. The image correction section 1163 stores the corrected RGB data in the memory 1161.

Returning to FIG. 7, the terminal 100 performs the AE correction (S33) or the red-eye correction (S35) and then finishes a series of processes (S34).

As described above, the terminal 100 in the third embodiment compares the color temperatures from the two RGB sensors 115 and 118 that are provided on different sides and performs the correction to the captured image in accordance with the comparison result. Accordingly, the terminal 100 performs the image correction, by the two RGB sensors 115 and 118, in consideration of a case where the direction of light that is received by the object is different from the direction of light that is received by the RGB sensor 118 when an image is captured. Thus, the terminal 100 may perform appropriate image correction even in a case where the direction of light that is received by the object is different from the direction of light that is received by the RGB sensor 118 when an image is captured, and appropriate image correction in accordance with a surrounding environment may thus be performed.

In the third embodiment, an example of the image correction is described with an example of the red-eye correction (S35). Such image correction is only one example, and the image correction may be performed to a specified portion of an image that is caused by direct reception of the sunlight. In such a case, for example, the image correction section 1163 determines that the image has a noise in a case where differences greater than a reference value are present between the RGB values of the pixels and the RGB values of adjacent pixels and may correct the RGB values of the concerned pixels to the reference value or lower while defining the concerned pixels as the specified portion.

Further, a description is made about an example where the object is an animal such as a human. However, the object may be a landscape or the like. In such a case also, a noise in the image that is caused by reception of the sunlight may be corrected.

In addition, the AE correction (S33) may be performed by a method that reduces values that are offset by a certain value or larger among the RGB values to a reference value or lower.

Other Embodiments

In the second and third embodiments, a description is made about an example where the side on which one sensor of the LCD side RGB sensor 115 and the camera module side RGB sensor 118 is provided is defined as the first side and the other sensor is installed on the second side that is provided on the back side with respect to the first side. For example, the two sensors 115 and 118 may not be provided on mutually opposite sides but may be provided on different sides.

Figure 9:
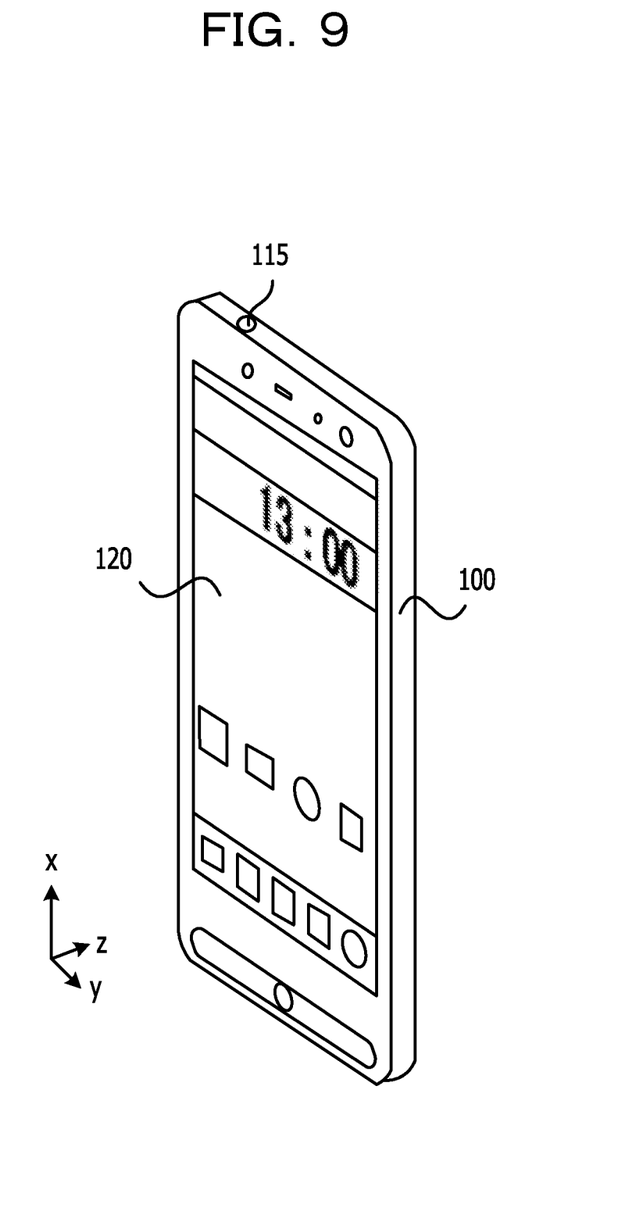
FIG. 9 illustrates an external appearance of the portable terminal device.

FIG. 9 illustrates an example of a case where the LCD side RGB sensor 115 is installed on an upper side of the terminal 100. The LCD side RGB sensor 115 is installed on the upper side, thereby enabling appropriate calculation of the color temperature around the object based on the sunlight or the like. Thus, the terminal 100 may perform appropriate image correction in accordance with a surrounding environment even in a case where the direction of light that is received by the object is different from the direction of light that is received by the RGB sensor 118 when an image is captured.

An upper side (yz plane) with respect to the side (xy plane) on which the LCD 120 is provided in the terminal 100 is defined as "upper side", for example.

The portable terminal device that is described in the second and third embodiments may include information processing devices such as tablet terminals, personal digital assistants (PDA), and portable game consoles, for example. Such an information processing device may carry out the image correction that is described in the second and third embodiments in a similar manner to the terminal 100.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A portable terminal device having a first color temperature sensor that is provided on a first side of the portable terminal device, and having a second color temperature sensor that is provided on a second side of the portable terminal device, the portable terminal device comprising:
   at least one camera module configured to capture an image; and
   an image processor configured to perform image correction to the image that is captured by the camera module based on at least one of first information from the first color temperature sensor and second information from the second color temperature sensor,
   wherein the image processor:
      performs image correction that corrects brightness of the image for the image that is captured by the camera module in a case where the second information has a higher value than the first information, and
      performs image correction that corrects an image of a specified portion of the image that is captured by the camera module without correcting the brightness of the image in a case where the first information is equivalent to the second information or the second information has a lower value than the first information.

2. The portable terminal device according to claim 1, wherein the image processor performs the image correction that increases brightness of the image in a case where the second information has a higher value than the first information and performs image correction that corrects pixel values related to red in an eye portion of the image that is captured by the camera module to a threshold value or lower in a case where the first information is equivalent to the second information or the second information has a lower value than the first information.

3. The portable terminal device according to claim 1, wherein the second side is provided on a back side of the first side in the portable terminal device.

4. The portable terminal device according to claim 1, wherein the image processor respectively obtains the first and second information from the first and second color temperature sensors when an image is captured.

5. An image correction method comprising:

capturing an image by at least one camera module; and correcting, by a computer processor, the image that is captured by the camera module based on at least one of first information from a first color temperature sensor that is provided on a first side of a portable terminal device and second information from a second color temperature sensor that is provided on a second side of the portable terminal device, wherein the correcting performs image correction that corrects brightness of the image for the image that is captured by the camera module in a case where the second information has a higher value than the first information, and performs image correction that corrects an image of a specified portion of the image that is captured by the camera module without correcting the brightness of the image in a case where the first information is equivalent to the second information or the second information has a lower value than the first information.

6. The image correction method according to claim 5, wherein the correcting performs image correction that increases brightness of the image in a case where the second information has a higher value than the first information and performs image correction that corrects pixel values related to red in an eye portion of the image that is captured by the camera module to a threshold value or lower in a case where the first information is equivalent to the second information or the second information has a lower value than the first information.

7. The image correction method according to claim 5, wherein the second side is provided on a back side of the first side in the portable terminal device.

8. The image correction method according to claim 5, wherein the correcting includes obtainment of the first and second information from the first and second color temperature sensors, respectively, when an image is captured.

9. A computer-readable non-transitory storage medium storing an image correction program that causes a computer to execute a process comprising:

capturing an image by at least one camera module; and correcting, by a computer processor, the image that is captured by the camera module based on at least one of first information from a first color temperature sensor that is provided on a first side of a portable terminal device and second information from a second color temperature sensor that is provided on a second side of the portable terminal device, wherein the correcting performs image correction that corrects brightness of the image for the image that is captured by the camera module in a case where the second information has a higher value than the first information, and performs image correction that corrects an image of a specified portion of the image that is captured by the camera module without correcting the brightness of the image in a case where the first information is equivalent to the second information or the second information has a lower value than the first information.

10. The computer-readable storage medium according to claim 9, wherein the correcting performs image correction that increases brightness of the image in a case where the second information has a higher value than the first information and performs image correction that corrects pixel values related to red in an eye portion of the image that is captured by the camera module to a threshold value or lower in a case where the first information is equivalent to the second information or the second information has a lower value than the first information.

11. The computer-readable storage medium according to claim 9, wherein the second side is provided on a back side of the first side in the portable terminal device.

12. The computer-readable storage medium according to claim 9, wherein the correcting includes obtainment of the first and second information from the first and second color temperature sensors, respectively, when an image is captured.

* * * * *